United States Patent
Furukawa et al.

(10) Patent No.: US 8,909,966 B2
(45) Date of Patent: Dec. 9, 2014

(54) WIRELESS POWER SUPPLY APPARATUS

(75) Inventors: Yasuo Furukawa, Tokyo (JP); Yuki Endo, Tokyo (JP)

(73) Assignee: Advantest Corporation, Tokyo (JP)

( * ) Notice: Subject to any disclaimer, the term of this patent is extended or adjusted under 35 U.S.C. 154(b) by 747 days.

(21) Appl. No.: 13/069,075

(22) Filed: Mar. 22, 2011

(65) Prior Publication Data

US 2011/0235800 A1 Sep. 29, 2011

Related U.S. Application Data

(60) Provisional application No. 61/318,202, filed on Mar. 26, 2010.

(51) Int. Cl.
*H04W 12/08* (2009.01)
*H02J 5/00* (2006.01)
*H02J 17/00* (2006.01)
*H01F 38/14* (2006.01)
*H04B 5/00* (2006.01)

(52) U.S. Cl.
CPC ............. *H04B 5/0037* (2013.01); *H02J 5/005* (2013.01); *H04B 5/0093* (2013.01); *H02J 17/00* (2013.01)
USPC .............. 713/330; 380/33; 380/274; 323/211

(58) Field of Classification Search
None
See application file for complete search history.

(56) References Cited

U.S. PATENT DOCUMENTS

| | | | | |
|---|---|---|---|---|
| 8,036,846 B1 * | 10/2011 | Vullaganti | ...................... | 702/104 |
| 2003/0112050 A1 * | 6/2003 | Mughal et al. | ................ | 327/334 |
| 2005/0146350 A1 * | 7/2005 | Kim et al. | ........................ | 326/30 |
| 2007/0089163 A1 * | 4/2007 | Denton | .............................. | 726/2 |
| 2007/0143052 A1 * | 6/2007 | Fujisawa et al. | .............. | 702/107 |
| 2007/0297260 A1 * | 12/2007 | Lee et al. | ........................ | 365/222 |
| 2009/0115449 A1 * | 5/2009 | Kim et al. | ........................ | 326/30 |
| 2009/0189744 A1 * | 7/2009 | Wang et al. | ................ | 340/10.42 |
| 2010/0030304 A1 * | 2/2010 | Haubrich et al. | ............... | 607/60 |
| 2010/0036773 A1 * | 2/2010 | Bennett | ............................ | 705/67 |
| 2010/0164296 A1 * | 7/2010 | Kurs et al. | ..................... | 307/104 |
| 2010/0194335 A1 * | 8/2010 | Kirby et al. | ................... | 320/108 |
| 2010/0237902 A1 * | 9/2010 | Sohn et al. | ...................... | 326/30 |
| 2010/0245052 A1 * | 9/2010 | Kitayoshi | .................... | 340/10.4 |

(Continued)

FOREIGN PATENT DOCUMENTS

JP 2008-053768 3/2008
JP 2009-261104 11/2009

OTHER PUBLICATIONS

A. Karalis, J.D. Joannopoulos, M. Soljacic, "Efficient wireless non-radiative mid-range energy transfer" Annals of Physics vol. 323, Jan. 2008, pp. 34-48.

(Continued)

*Primary Examiner* — Michael R Vaughan
(74) *Attorney, Agent, or Firm* — Ladas & Parry, LLP (57) ABSTRACT

A wireless power supply apparatus generates an electric signal frequency-modulated or otherwise phase-modulated according to a transmission-side code that is determined beforehand with a wireless power reception apparatus. The electric signal thus generated is transmitted via a transmission coil so as to generate an electric power signal including any one of an electric field, a magnetic field, and an electromagnetic field. The wireless power reception apparatus receives the electric power signal using a reception coil. A control unit changes the impedance of a resonance circuit that comprises the reception coil and a resonance capacitor, according to a reception-side code that is to correspond to the transmission-side code.

4 Claims, 10 Drawing Sheets

(56) References Cited

U.S. PATENT DOCUMENTS

| | | | | |
|---|---|---|---|---|
| 2010/0276995 A1* | 11/2010 | Marzetta et al. | | 307/11 |
| 2011/0044396 A1* | 2/2011 | Fujii | | 375/268 |
| 2011/0128038 A1* | 6/2011 | Ko | | 326/30 |
| 2011/0184888 A1* | 7/2011 | Lee et al. | | 705/412 |
| 2011/0235403 A1* | 9/2011 | Kang | | 365/148 |
| 2012/0112692 A1* | 5/2012 | Arai | | 320/108 |
| 2012/0235500 A1* | 9/2012 | Ganem et al. | | 307/104 |
| 2012/0235634 A1* | 9/2012 | Hall et al. | | 320/108 |
| 2013/0038138 A1* | 2/2013 | Cook et al. | | 307/104 |

OTHER PUBLICATIONS

Office action dated Jul. 18, 2014 from corresponding JP Patent Application No. 2011-068846 and its English summary provided by the applicant.

* cited by examiner

WIRELESS POWER SUPPLY APPARATUS

CROSS-REFERENCE TO RELATED APPLICATIONS

This application claims priority to U.S. Provisional Patent Application No. 61/318,202 filed on Mar. 26, 2010 the disclosure of which is incorporated herein by reference.

BACKGROUND OF THE INVENTION

1. Field of the Invention

The present invention relates to a wireless power supply technique.

2. Description of the Related Art

In recent years, wireless (contactless) power transmission has been receiving attention as a power supply technique for electronic devices such as cellular phone terminals, laptop computers, etc., or for electronic vehicles. Wireless power supply transmission can be classified into three principal methods using an electromagnetic induction, an electromagnetic wave, and an electric field/magnetic field resonance.

The electromagnetic induction method is employed to supply electric power at a short range (several mm or less), which enables electric power of several hundred watts to be transmitted in a band that is equal to or lower than several hundred kHz. The power use efficiency thereof is on the order of 60% to 98%.

In a case in which electric power is to be supplied over a relatively long range of several meters or more, the electromagnetic wave reception method is employed. The electromagnetic wave reception method allows electric power of several watts or less to be transmitted in a band between medium waves and microwaves. However, the power use efficiency thereof is small. The electric field/magnetic field resonance method has been receiving attention as a method for supplying electric power with relatively high efficiency at a middle range on the order of several meters (see Non-patent document 1).

RELATED ART DOCUMENTS

Patent Documents

[Non-patent document 1] A. Karalis, J. D. Joannopoulos, M. Soljacic, "Efficient wireless non-radiative mid-range energy transfer" ANNALS of PHYSICS Vol. 323, January 2008, pp. 34-48.

If such a wireless power supply becomes widely used in the future, a situation will occur in which a given power supply apparatus will be available as a supply of electricity to the general public. In such a situation, in order to prevent power theft or the like, there will be a need to provide a system which enables electric power to be selectively supplied only to specified users or specified devices.

SUMMARY OF THE INVENTION

The present invention has been made in view of such a situation. Accordingly, it is an exemplary purpose of the present invention to provide a power supply technique which allows electric power to be selectively supplied to only specified users.

An embodiment of the present invention relates to a wireless power reception apparatus configured to receive an electric power signal, including any one of an electric field, a magnetic field, and an electromagnetic field, frequency-modulated or otherwise phase-modulated according to a given transmission-side code, and transmitted from a power supply apparatus. The wireless power reception apparatus comprises: a reception coil configured to receive the electric power signal; a resonance capacitor that, together with the reception coil, forms a resonance circuit; and a control unit configured to change the impedance of the resonance circuit based upon a reception-side code that is to correspond to the transmission-side code used in the power supply apparatus such that resonance occurs between the resonance circuit and the electric power signal.

The transmission coil (antenna) on the power supply apparatus side and the reception coil on the power reception apparatus side can be regarded as forming a transformer having a low coupling coefficient. In this case, by controlling the impedance of the power reception apparatus to satisfy the condition for resonance, such an arrangement is capable of increasing the coupling coefficient according to the principle of the tuned coupling transformer. With such an arrangement, the condition for resonance in the power reception apparatus changes over time according to the transmission-side code. Thus, the power reception apparatus can satisfy the condition for resonance only when it acquires a valid transmission-side code that corresponds to the transmission-side code. That is to say, the power reception apparatus can receive a large amount of electric power with high efficiency only in this case. This enables selective reception of electric power by only specific users.

In general, in some cases, the term "resonance" represents energy transmission/reception between L and C over multiple cycles. However, in the present invention, the term "resonance" essentially represents energy transmission/reception between L and C in a single cycle, which is the characteristic feature of the present invention. The component used to transmit/receive the energy is not restricted to such a passive component as the inductor L and the capacitor C. Also, an active circuit such as a gyrator may be employed.

Also, the control unit may hold beforehand the reception-side code that corresponds to the transmission-side code used in the power supply apparatus.

Also, the power supply apparatus may be configured to transmit the reception-side code that corresponds to the transmission-side code, together with the electric power signal. Also, the control unit may be configured to receive the reception-side code from the power supply apparatus, and to change the impedance of the resonance circuit based upon the code thus received.

The electric power signal may be pulse-modulated. Examples of such pulse modulation include pulse frequency modulation, pulse density modulation, pulse width modulation, etc.

Another embodiment of the present invention relates to a wireless power supply apparatus configured to transmit an electric power signal to a wireless power reception apparatus. The wireless power supply apparatus comprises: a modulator configured to generate an electric signal that is frequency-modulated or otherwise phase-modulated according to a transmission-side code that is determined beforehand with the wireless power reception apparatus; and a transmission unit configured to transmit the electric power signal via a transmission coil so as to generate an electric power signal including any one of an electric field, a magnetic field, and an electromagnetic field.

Yet another embodiment of the present invention relates to a wireless power supply system. The wireless power supply system comprises: a wireless power supply apparatus according to any one of the aforementioned embodiments; and a wireless power reception apparatus according to any one of the aforementioned embodiments.

Yet another embodiment of the present invention relates to a power supply method. The power supply method comprises: at a power supply apparatus, generating an electric signal frequency-modulated or otherwise phase-modulated according to a transmission-side code that is determined beforehand with a power reception apparatus; at the power supply apparatus, transmitting the electric signal via a transmission coil, and generating an electric power signal including any one of an electric field, a magnetic field, and an electromagnetic field; at the power reception apparatus, receiving the electric power signal via a reception coil; at the power reception apparatus, changing the impedance of a resonance circuit that comprises the reception coil and a resonance capacitor according to a reception-side code that is to correspond to the transmission-side code, such that resonance occurs between the resonance circuit and the electric power signal; and storing a signal received by the resonance circuit in a power storage capacitor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
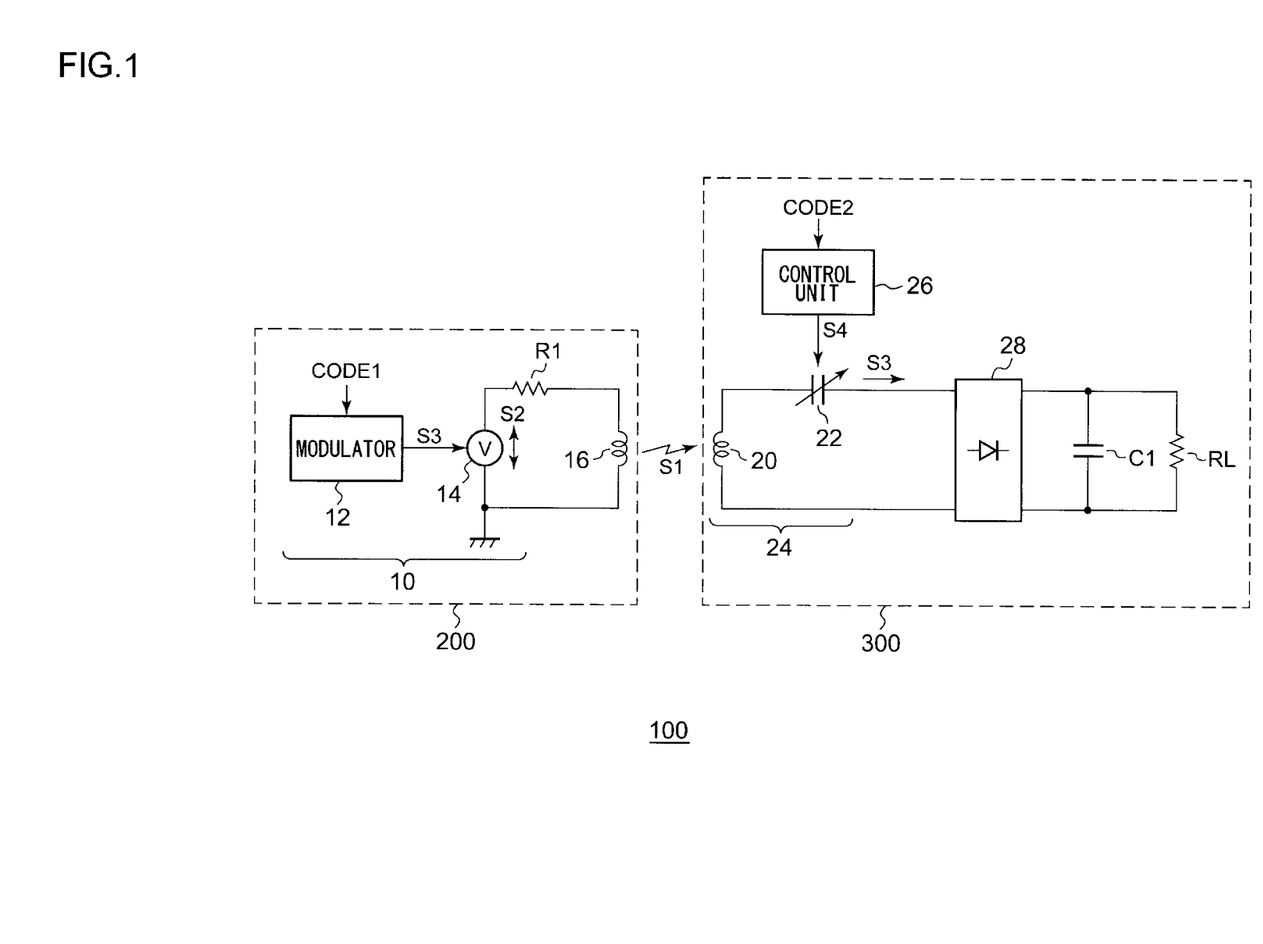
FIG. 1 is a block diagram which shows a configuration of a wireless power supply system according to an embodiment.

FIG. 1 is a block diagram which shows a configuration of a wireless power supply system 100 according to an embodiment. The wireless power supply system 100 includes a wireless power supply apparatus 200 and a wireless power reception apparatus 300. First, description will be made regarding the wireless power supply apparatus 200.

The wireless power supply apparatus 200 transmits an electric power signal to the wireless power reception apparatus 300. As an electric power signal S1, the wireless power supply system 100 uses the near-field component (electric field, magnetic field, or electromagnetic field) of electromagnetic waves that has not become radio waves.

The wireless power supply apparatus 200 includes a modulator 10 and a transmission coil 16. The wireless power supply apparatus 200 has a given code (which will be referred to as the "transmission-side code") CODE1 prepared beforehand. The modulator 10 generates an electric signal S2 subjected to frequency modulation or phase modulation performed using a modulation signal that corresponds to the transmission-side code CODE1. In the present embodiment, the electric signal S2 is configured as a pulse signal. In this case, examples of available modulation methods include a pulse frequency modulation method, a pulse width modulation method, a pulse density modulation method, a pulse position modulation method, etc. With such an arrangement in which such a pulse signal is employed, the electric signal S2 can be generated using only a switching operation between low level and high level. For example, the frequency of the electric signal S2 is appropriately selected from a range between several hundred kHz and several MHz.

The modulator 10 includes a modulation signal generating unit 12 and a signal generator 14. For example the signal generator 14 is a driver configured to generate a voltage which switches between high level and low level. The modulation signal generating unit 12 generates a modulation signal S3 based upon the transmission-side code CODE1, and performs switching of the signal generator 14 according to the modulation signal S3. The modulation signal S3 is configured as a bit sequence of zeros and ones. As a result, the signal generator 14 generates the electric signal S2 in the form of a pulse. Also, any waveform generator may be employed as the modulator 10.

The transmission coil 16 is configured as an antenna, and emits the electric signal S2 generated by the modulator 10 as the near-field signal (electric power signal) S1 including any one of an electric field, a magnetic field, and an electromagnetic field.

The above is the configuration of the wireless power supply apparatus 200. Next, description will be made regarding the configuration of the wireless power reception apparatus 300.

The wireless power reception apparatus 300 receives the electric power signal S1 subjected to frequency modulation or phase modulation according to the given transmission-side code CODE1 and transmitted from the wireless power supply apparatus 200. The wireless power reception apparatus 300 includes a reception coil 20, a resonance capacitor 22, a control unit 26, a rectifier circuit 28, and a power storage capacitor C1.

The reception coil 20 receives the electric power signal S1 in a state in which it is positioned in the vicinity of the transmission coil 16. The resonance capacitor 22 and the reception coil 20 form an LC resonance circuit 24. The resonance circuit 24 generates an electric current (electric signal) I1 that corresponds to the electric power signal S1. The power storage capacitor C1 is charged by the current I1 generated by the resonance circuit 24, thereby storing the energy of the electric power signal S1 thus received. A typical rectifier circuit 28 is arranged between the power storage capacitor C1 and the resonance circuit 24.

The control unit 26 changes the impedance of the resonance circuit 24, i.e., the resonance frequency $fr = 1/\{2\pi \cdot \sqrt{}$ (LC)}, according to a given reception-side code CODE2. In order to allow the resonance frequency fr of the resonance circuit 24 to be changed, at least one of the capacitance C of the resonance capacitor 22 or the inductance L of the reception coil 20 is configured as a variable value. FIG. 1 shows an arrangement in which the resonance capacitor 22 is configured as a variable capacitor, and the control unit 26 is configured to change the capacitance of the resonance capacitor 22. Switching of the resonance frequency fr is preferably performed at a timing at which the current that flows through the resonance circuit 24 becomes zero, i.e., at a timing at which the voltage thereof becomes the maximum. Thus, such an arrangement can appropriately suppress turbulence that occurs in the resonance.

By means of the reception coil 20 and the resonance capacitor 22 resonating with the frequency (transmission frequency) of the electric power signal S1, such an arrangement is capable of supplying a large amount of electric power from the wireless power supply apparatus 200 to the wireless power reception apparatus 300. The energy (electric power) stored in the resonance circuit 24 is supplied to a load RL. The load RL is not restricted in particular.

Figure 2:
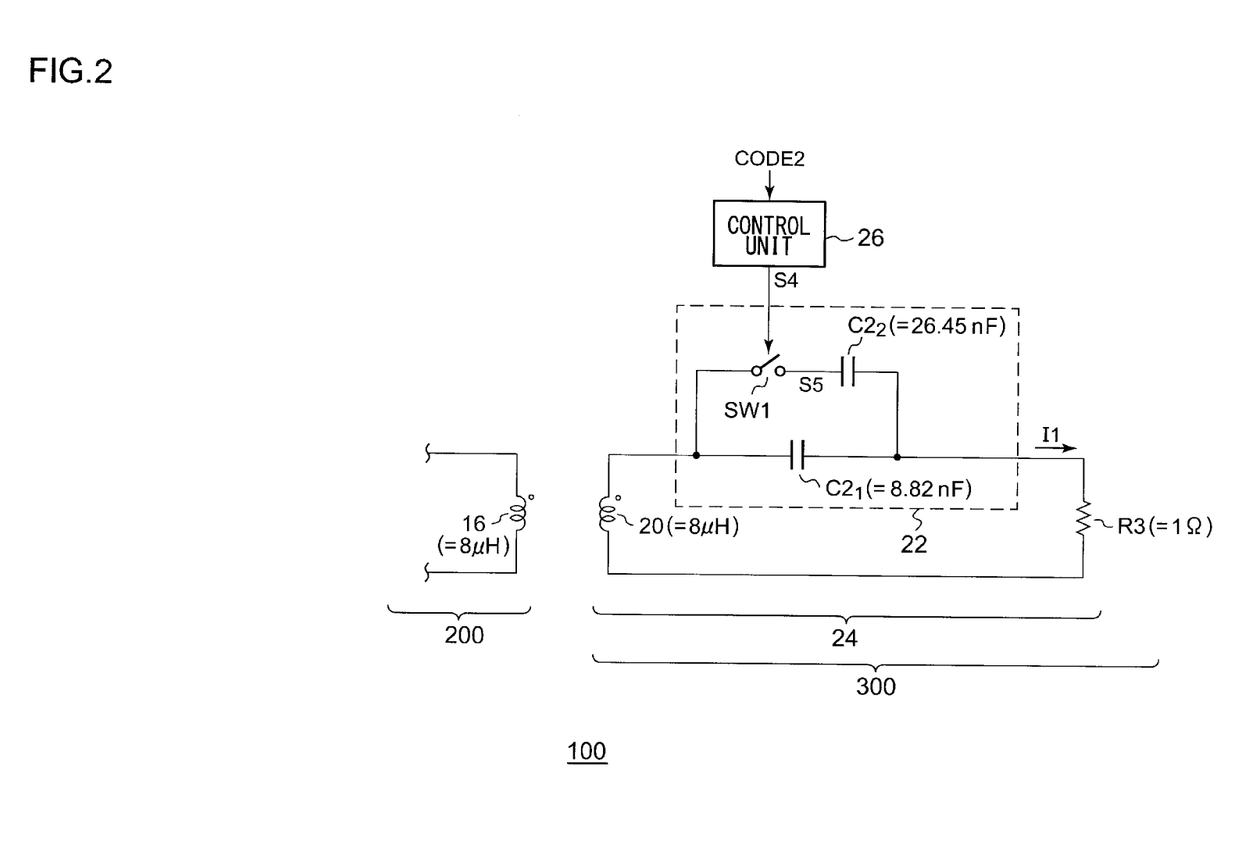
FIG. 2 is a circuit diagram which shows a specific example configuration of a wireless power reception apparatus.

FIG. 2 is a circuit diagram which shows a specific example configuration of the wireless power reception apparatus 300. The electric power signal S1, which switches by frequency modulation between 1 MHz and 0.5 MHz, is transmitted via the transmission coil 16. With the wireless power reception apparatus 300, the resonance frequency of the resonance circuit 24 can be switched between two levels. The resonance capacitor 22 includes multiple capacitors $C2_1$ and $C2_2$, and a switch SW1. The capacitor $C2_2$ and the switch SW1 are arranged in series on a path arranged in parallel with the capacitor $C2_1$. The switch SW1 is turned on and off according to a control signal S4 generated by the control unit 26. In the circuit diagram, the capacitance values and the inductance values are shown for exemplary purpose only. When the switch SW1 is on, the resonance frequency fr is set to 0.5 MHz, and when the switch SW1 is off, the resonance frequency fr is set to 1 MHz. FIG. 2 also shows a series resistance component R3.

The above is the configuration of the wireless power reception apparatus 300. Next, description will be made regarding the operation of the wireless power supply system 100.

Figure 3:
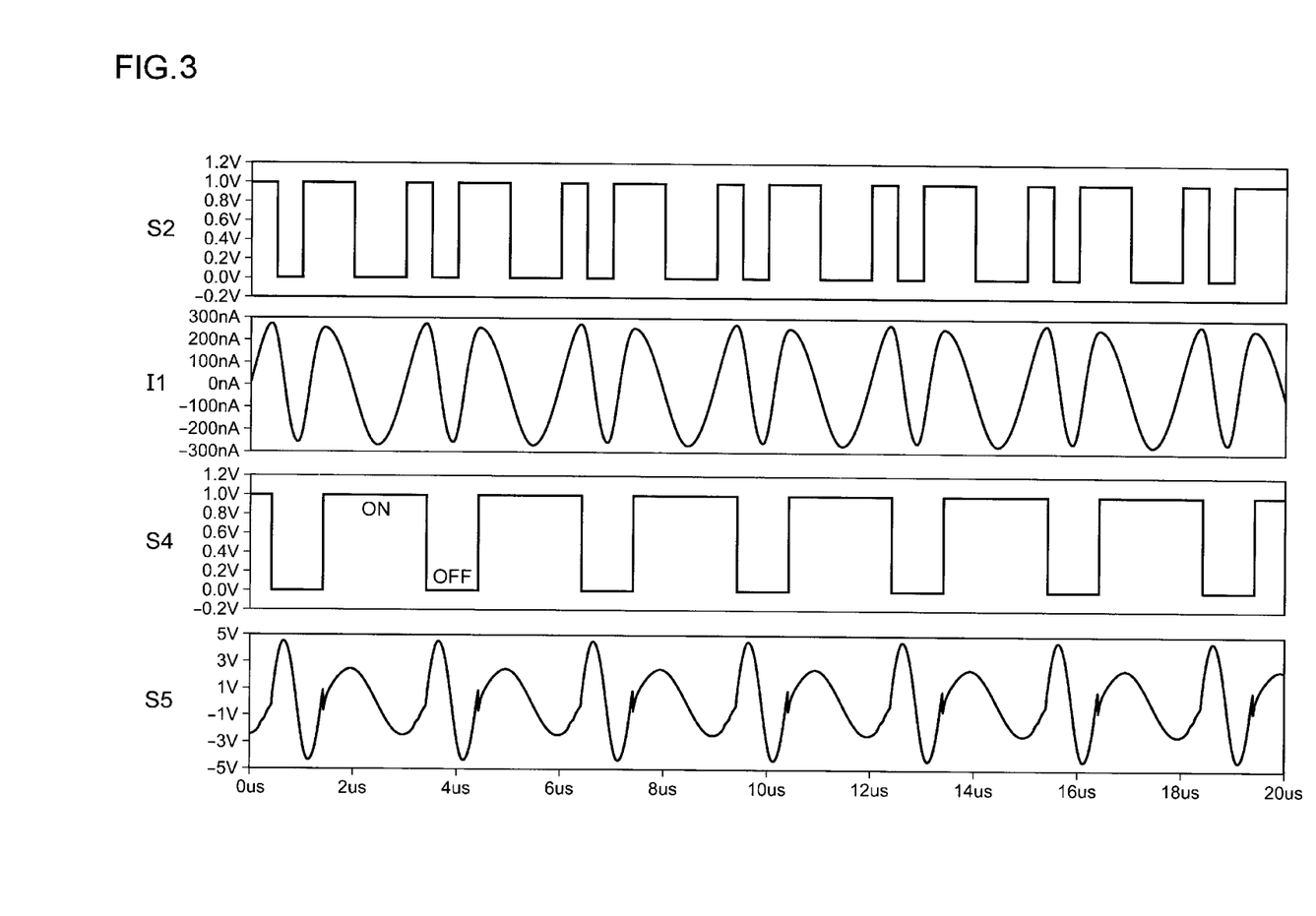
FIG. 3 is a time chart which shows the operation of the wireless power supply system.

FIG. 3 is a time chart which shows the operation of the wireless power supply system 100. From top to bottom in the following order, FIG. 3 shows simulated waveforms of the electric signal S2 on the wireless power supply apparatus 200 side, the electric current waveform I1 on the wireless power reception apparatus 300 side, the control signal S4, and a voltage S5 at one terminal of the switch SW1, in a case in which the coupling coefficient between the transmission coil 16 and the reception coil 20 is assumed to be 0.8. The electric signal S2 on the transmission side is configured as a pulse signal with a period that alternately switches between 1 μsec (1 MHz) and 2 μsec (0.5 MHz). In practice, the electric signal S2 is modulated in a more complicated manner according to the transmission-side code CODE1. However, FIG. 3 shows a simplified example for ease of understanding.

The control signal S4 is a pulse signal that corresponds to the reception-side code CODE2. The time chart in FIG. 3 shows a case in which the reception-side code CODE2 corresponds to the transmission-side code CODE1. In this case, the resonance frequency of the resonance circuit 24 changes following the modulation of the frequency or phase of the electric power signal S1. Thus, by means of the effects of a tuned coupling transformer, the reception coil 20 receives the electric power signal S1 with high efficiency, thereby storing the electric power signal S1 in the power storage capacitor C1.

If the reception-side code CODE2 is not a valid code that corresponds to the transmission-side code CODE1, such an arrangement cannot control the resonance frequency fr so as to follow the variation in the power supply signal S1, thereby reducing the power supply efficiency. The relation between the wireless power supply apparatus 200 and the wireless power reception apparatus 300 can be understood as the relation between a modulator and a demodulator. With such an arrangement, the reception-side code CODE2 functions as a key used to perform demodulation.

A system administrator may issue such a valid reception-side code CODE2 beforehand to a wireless power reception apparatus 300 that is allowed to receive electric power. Alternatively, an arrangement may be made in which, handshaking and certification are performed before the power supply operation, and one apparatus transmits a notice to the other apparatus such that they share the same code between the wireless power supply apparatus 200 and the wireless power reception apparatus 300.

It should be noted that if the modulation level of the frequency modulation is low in the wireless power supply system 100, even if an invalid code is used, a certain amount of electric power is supplied (power theft) when center frequency matching occurs between the power supply side and the power reception side. Accordingly, such an arrangement is undesirable. Thus, the modulation level is preferably set to a value such that the wireless power reception apparatus 300 cannot receive sufficient electric power when an invalid code is used.

The above is the operation of the wireless power supply system 100. With the wireless power supply system 100 according to the embodiment, the electric power itself is modulated in the form of a code and thereby transmitted. Such an arrangement is capable of supplying electric power selectively to valid users and valid devices only, while preventing unintended power supply to invalid wireless power reception apparatuses 300.

The wireless power supply system 100 is effectively employed in a system in which the users are charged for receiving the power supply. With such an arrangement, such a valid reception-side code CODE2 should be transmitted as a notice only to users who have paid electricity charges. Alternatively, the electric power signal S1 may be generated using a transmission-side code CODE1 that corresponds to the particular reception-side code CODE2 that is unique to the wireless power reception apparatus 300 of a user who has paid the electricity charges.

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Figure 4:
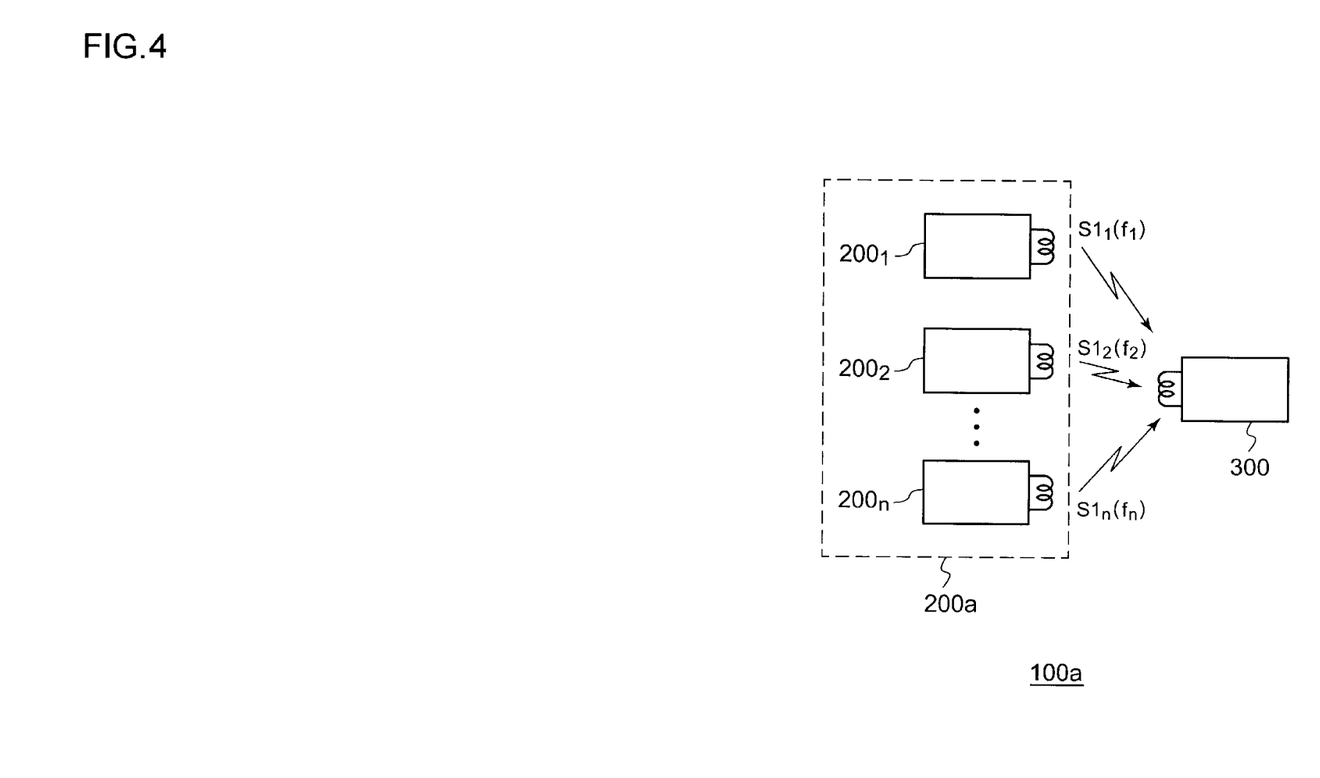
FIG. 4 is a block diagram which shows another example configuration of the wireless power supply system.

FIG. 4 is a block diagram which shows another example configuration of a wireless power supply system. A wireless power supply apparatus 200 includes multiple power supply units $200_1$ through $200_n$. The power supply units $200_1$ through $200_n$ each have the same configuration as that of the wireless power supply apparatus 200 shown in FIG. 1.

The power supply units $200_1$ through $200_n$ are arranged at spatially separate positions. With such an arrangement, the power supply units $200_1$ through $200_n$ are configured to respectively transmit electric power signals $S1_1$ through $S1_n$ having different frequencies. Furthermore, the power supply units $200_1$ through $200_n$ enter an active state in a time-shared manner. That is to say, at a given time slot, the power supply unit $200_i$ enters the active state. Subsequently, at the next time slot, any one of the other power supply units, i.e., the power supply unit $200_j$, enters the active state, thereby generating the electric power signal S1 having a frequency that changes in a time-shared manner. It should be noted that the order and the cycle that determine which power supply unit is switched to the active state are determined based upon the aforementioned transmission-side code CODE1.

With the wireless power supply apparatus 200a shown in FIG. 4, electric power can be transmitted in the form of a code in the same way as with the wireless power supply apparatus 200 shown in FIG. 1. Furthermore, such an arrangement has a configuration in which multiple power supply units are arranged at different spatial positions. Thus, such an arrangement suppresses spatial concentration of the electric power supply.

Moreover, the wireless power reception apparatus 300 is capable of providing a state having a high coupling coefficient between the reception coil 20 of the wireless power reception apparatus 300 and each of the multiple power supply units $200_1$ through $200_n$ according to the principle of the tuned coupling transformer, as long as the wireless power reception apparatus 300 has a valid reception-side code CODE2 as information. Thus, such an arrangement is capable of receiving energy with high efficiency. In this state, such an arrangement would provide minimum energy leakage for each frequency.

Figure 5:
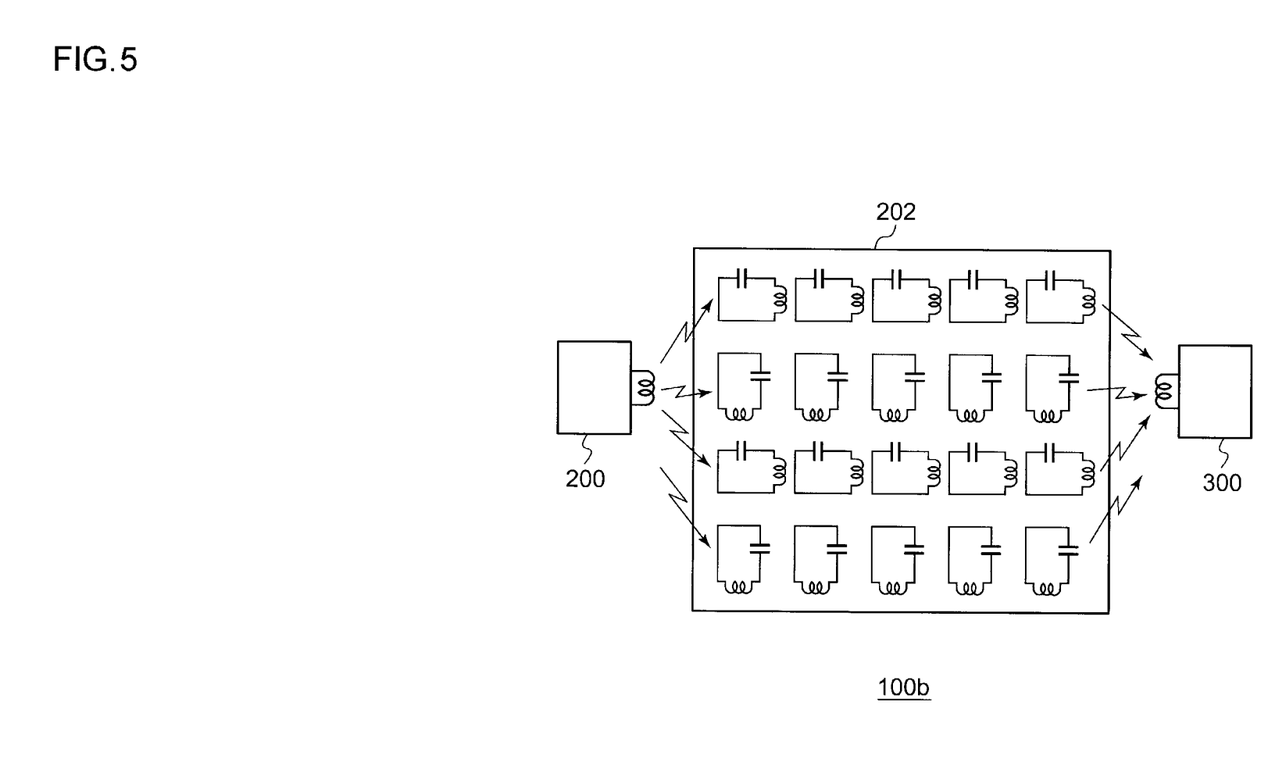
FIG. 5 is a diagram which shows another modification of the wireless power supply system.

FIG. 5 is a diagram which shows another modification of the wireless power supply system. A transmission path 202 is arranged between the wireless power supply apparatus 200 and the wireless power reception apparatus 300. The transmission path 202 transmits the electric power signal S1 generated by the wireless power supply apparatus 200 in a spatially distributed manner. With such a wireless power supply system 100b, the energy concentration can be limited to the area in the vicinity of the load terminal (wireless power reception apparatus 300).

Figure 6A:
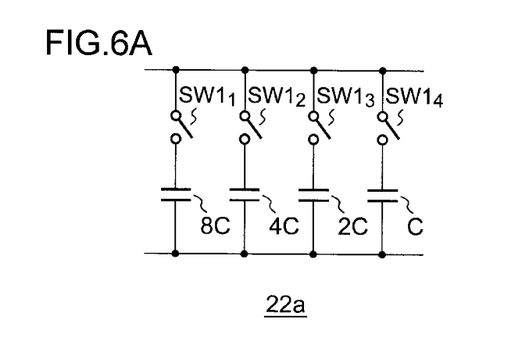
FIGS. 6A through 6C are diagrams each showing a modification of the wireless power reception apparatus.
Figure 6B:
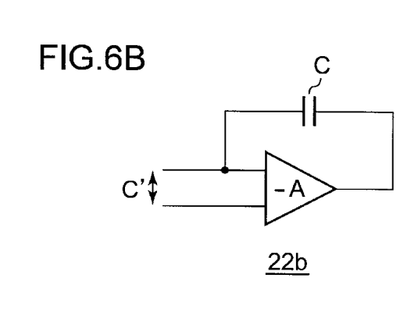
Figure 6C:
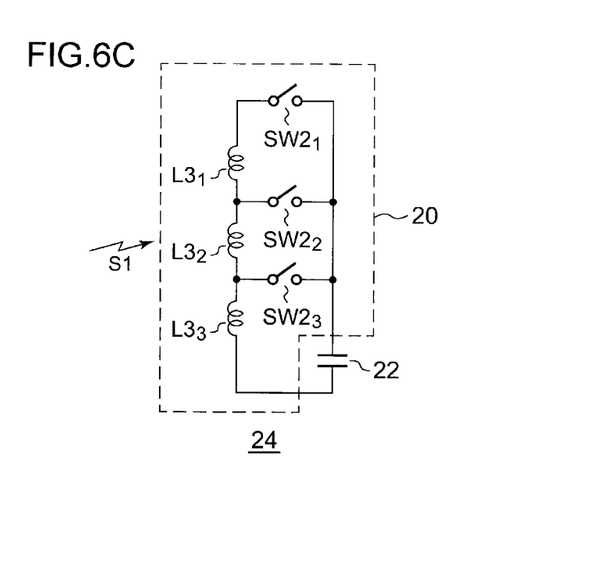

FIGS. 6A through 6C are diagrams each showing a modification of the wireless power reception apparatus 300.

FIG. 6A shows an arrangement in which a resonance capacitor 22a is configured as a capacitor cell including capacitors 8C, 4C, 2C, and C, each having a particular capacitance weighted by a binary value, and switches $SW_1$ through $SW_4$ that correspond to the respective capacitors. The resonance capacitor 22a shown in FIG. 6A allows the resonance frequency fr to be switched between multiple levels (e.g., sixteen levels).

FIG. 6B shows an arrangement in which the resonance capacitor 22 is configured as a combination of an amplifier 30 and a capacitor C. The amplifier 30 is configured as an inverter amplifier having a gain of −A. Furthermore, the capacitor C is arranged on a feedback path for the amplifier 30. The effective capacitance C' of the resonance capacitor 22b is provided by means of the mirror effect, which is represented by C'=C×(1+A). Thus, by switching the gain of the amplifier 30, such an arrangement is capable of switching the effective capacitance of the resonance capacitor 22b. The configuration of the amplifier is not restricted in particular. Examples of control operations used in the amplifier 30 include: a control operation in which a negative feedback coefficient is controlled using an R-2R network; and a control operation using a switched capacitor.

FIG. 6C shows a modification in which the inductance of the reception coil 20 is variable. FIG. 6C shows an arrangement in which the reception coil 20 includes multiple coils $L3_1$ through $L3_3$, and multiple switches $SW2_1$ through $SW2_3$. The number of coils and the number of switches should be determined according to the levels between which the inductance should be switched. Also, the coils $L3_1$ through $L3_3$ may be configured by providing multiple taps to a single coil. Also, separate coils may be connected so as to form the coil $L3_1$ through coil $L3_3$.

Figure 7A:
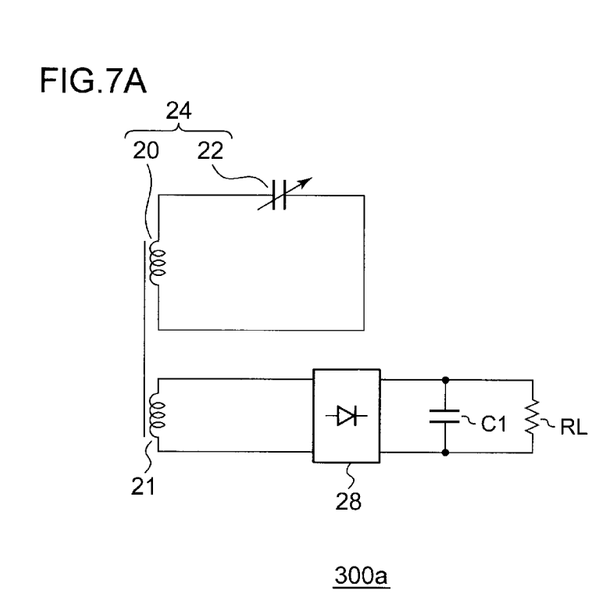
FIGS. 7A and 7B are diagrams each showing a modification of the wireless power reception apparatus.
Figure 7B:
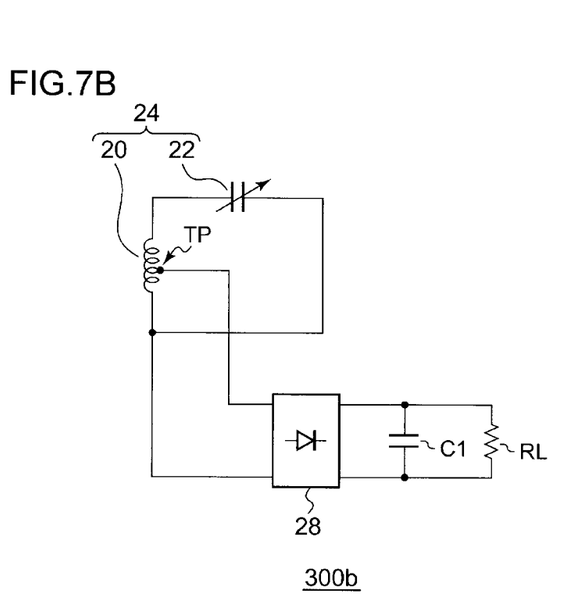

Description has been made with reference to FIGS. 1 and 2 regarding an arrangement in which electric power is acquired at both terminals of the reception coil 20. However, the present invention is not restricted to such an arrangement. FIGS. 7A and 7B are diagrams each showing a modification of the wireless power reception apparatus. A wireless power reception apparatus 300a shown in FIG. 7A includes an auxiliary coil 21 that is densely combined with the reception coil 20, arranged independent of the resonance circuit 24, and is to be used to acquire electric power. With such an arrangement, the energy stored in the resonance circuit 24 is acquired by the auxiliary coil 21, and the energy thus acquired is supplied to the rectifier circuit 28 and the power storage capacitor C1.

FIG. 7B shows a wireless power reception apparatus 300b including the reception coil 20 having a tap TP. With such an arrangement, energy stored in the resonance circuit 24 is acquired via the tap provided to the reception coil 20, and the energy thus acquired is supplied to the rectifier circuit 28 and the power storage capacitor C1.

Description has been made regarding an arrangement in which the electric signal S2 is configured as a pulse signal. Also, the electric signal S2 may be configured as a sine wave (trigonometric wave). In this case, such an arrangement may employ a quadrature modulator, a typical frequency modulator, or a typical phase modulator. Also, the modulation method for the electric signal S2 is not restricted to such frequency modulation. Also, other modulation methods such as phase modulation may be employed.

Figure 8:
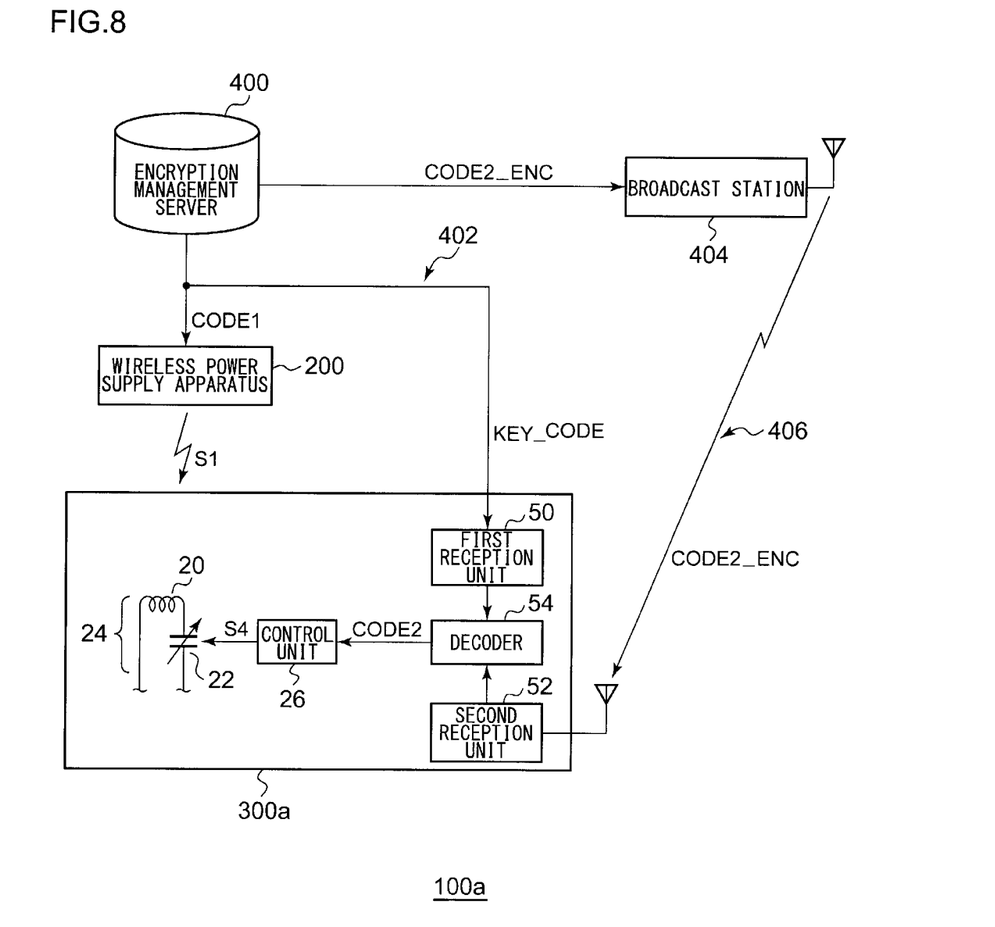
FIG. 8 is a block diagram which shows a wireless power supply system according to an embodiment.

Next, description will be made regarding a technique for delivering the valid reception-side code CODE2 to the wireless power reception apparatus 300. FIG. 8 is a block diagram which shows a wireless power supply system 100a according to an embodiment.

The wireless power supply system 100a includes an encryption management server 400, a first network (first transmission channel) 402, a broadcast station 404, and a second network (second transmission channel) 406, in addition to the wireless power supply apparatus 200 and the wireless power reception apparatus 300a.

The first network 402 connects the encryption management server 400 and the wireless power supply system 100, and connects the encryption management server 400 and the wireless power supply apparatus 200. In the present embodiment, the first network 402 is configured as the Internet network.

The encryption management server 400 transmits the transmission-side code CODE1 to the wireless power supply system 100. The encryption management server 400 periodically updates the transmission-side code CODE1. The update cycle is preferably determined to be shorter than a period of time required for malicious users to crack the transmission-side code CODE1.

Furthermore, the encryption management server 400 encrypts the transmission-side code CODE2 that corresponds to the transmission-side code CODE1, based upon a predetermined key code KEY_CODE. The encryption method is not restricted in particular. The reception-side code CODE2 thus encrypted will be referred to as the "encrypted reception-side code CODE2_ENC". The broadcast station 404 broadcasts the encrypted reception-side code CODE2_ENC via the second network 406. It is needless to say that the update cycle of the encrypted reception-side code CODE2_ENC is the same as that of the transmission-side code CODE1. Broadcast waves, such as TV or radio broadcast waves, may be employed as such a second network 406. Also, a wireless LAN (Local Area Network) system may be employed. Also, other kinds of networks may be employed.

The wireless power reception apparatus 300a includes a first reception unit 50, a second reception unit 52, and a decoder 54, in addition to the components shown in FIG. 1. The first reception unit 50 receives the key code KEY_CODE via the first network 402. Secure channels such as e-mail or the like may be used to transmit the key code KEY_CODE. Alternatively, the user of the wireless power reception apparatus 300a may acquire the key code KEY_CODE by accessing a predetermined site on the Internet. That is to say, the key code should be distributed only to the wireless power reception apparatuses 300a that are to be allowed to receive electric power via the electric power signal S1. The distribution method for the key code KEY_CODE is not restricted in particular.

The second reception unit 52 receives the encrypted reception-side code CODE2_ENC broadcast via the second network 406. The decoder 54 decrypts the encrypted reception-side code CODE2_ENC so as to generate the reception-side code CODE2. The control unit 26 controls the resonance frequency of the resonance circuit 24 based upon the reception-side code CODE2 thus decrypted.

Such a wireless power supply system 100a is capable of selectively supply electric power to specific wireless power reception apparatuses 300 only, while updating the transmission-side code CODE1 at a predetermined cycle. Furthermore, with the wireless power supply system 100a shown in FIG. 8, the electric power signal S1 is encrypted based upon the transmission-side code CODE1, and the reception-side code CODE2 is encrypted based upon the key code KEY_CODE, thereby improving the security of the system.

With the wireless power supply system 100a shown in FIG. 8, a broadcast network may be employed as the first network 402, and the Internet may be employed as the second network 406.

Figure 9:
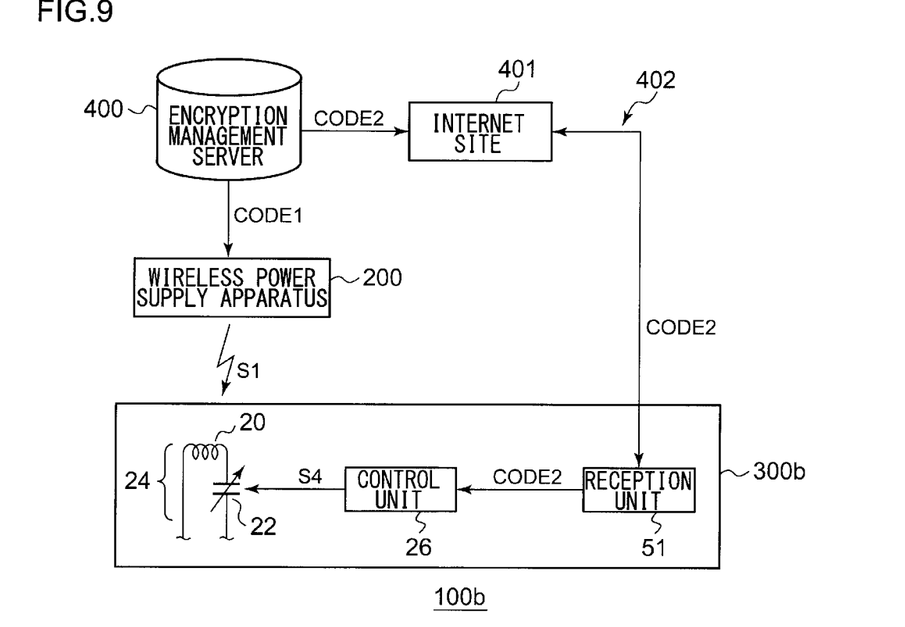
FIG. 9 is a block diagram which shows a wireless power supply system according to a first modification.

Description has been made of the wireless power supply system 100a shown in FIG. 8 regarding a system employing the two networks 402 and 404. Also, only a single network may be employed. FIG. 9 is a block diagram which shows a wireless power supply system 100b according to a first modification. The latest reception-side code CODE2 is uploaded to an Internet site 401. The user of the wireless power reception apparatus 300b accesses the Internet site 401, and the latest valid reception-side code CODE2 is thereby distributed to the reception unit 51.

Such a wireless power supply system 100b is capable of selectively supplying electric power only to wireless power reception apparatuses 300b that are used by users who access the Internet site 401. The user of the wireless power reception apparatus 300b accesses the Internet site 401, thereby acquiring the reception-side code CODE2 used to receive electric power, which functions as an incentive. The administrator of the Internet site 401 provides the wireless power supply as an incentive, thereby increasing the access count of the Internet site 401 administrated by the administrator.

Figure 10:
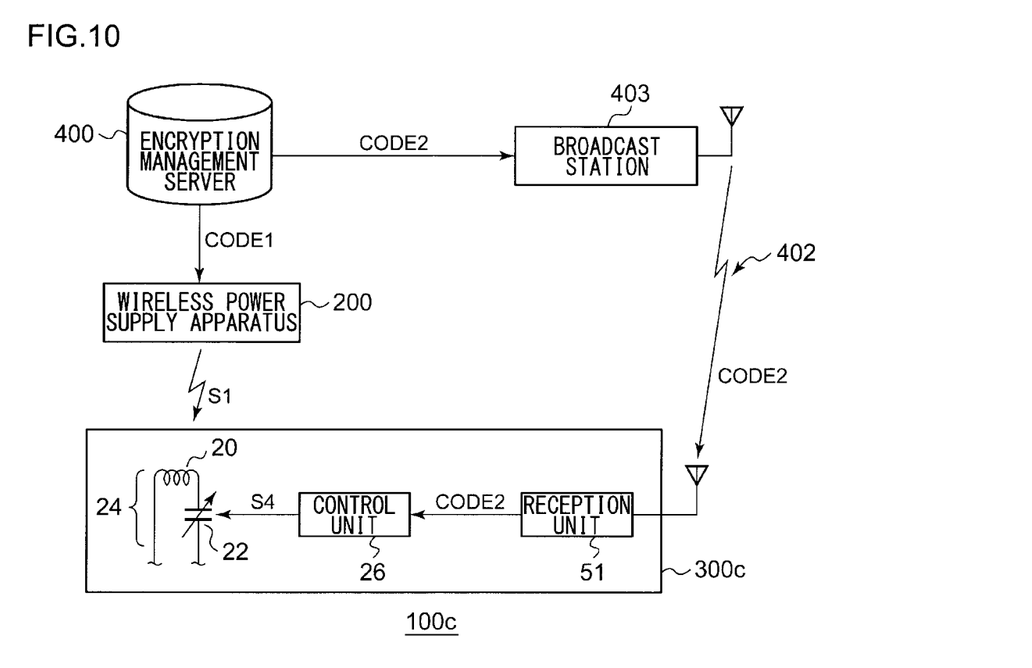
FIG. 10 is a block diagram which shows a wireless power supply system according to a second modification.

FIG. 10 is a block diagram which shows a power supply system 100c according to a second modification. A wireless power supply system 100c shown in FIG. 10 includes a broadcast station 403 instead of the Internet site 401 included in the wireless power supply system 100b shown in FIG. 9. The broadcast station 403 distributes the latest valid reception-side code CODE2 accompanying the broadcast contents.

Such a wireless power supply system 100c is capable of selectively supplying electric power only to wireless power reception apparatuses 300c that are used by users who receive the broadcast from the broadcast station 403. The user of the wireless power reception apparatus 300c receives the broadcast, thereby acquiring the reception-side code CODE2 used to receive electric power, which functions as an incentive. The administrator of the broadcast station 403 provides the wireless power supply as an incentive, thereby increasing the viewership of the broadcast station administrated by the administrator.

While the preferred embodiments of the present invention have been described using specific terms, such description is for illustrative purposes only, and it is to be understood that changes and variations may be made without departing from the spirit or scope of the appended claims.

What is claimed is:

1. A wireless power reception apparatus comprising:
   a reception coil configured to receive an electric power signal including any one of an electric field, a magnetic field, and an electromagnetic field transmitted from a power supply apparatus, wherein the electric power signal is frequency-modulated or otherwise phase-modulated according to a modulation signal corresponding to a given transmission-side code at the power supply apparatus;
   a resonance capacitor that, together with the reception coil, forms a resonance circuit;
   a control unit configured to change the impedance of the resonance circuit based upon a reception-side code that is to correspond to the transmission-side code used in the power supply apparatus such that resonance occurs between the resonance circuit and the electric power signal; and
   a reception unit configured to acquire the reception-side code by accessing a predetermined Internet site.

2. A wireless power reception apparatus according to claim 1, further comprising a reception unit configured to receive the reception-side code broadcast via broadcast waves.

3. A wireless power reception apparatus according to claim 1, wherein the electric power signal is pulse-modulated.

4. A wireless power supply system comprising:
   a wireless power supply apparatus configured to transmit an electric power signal including any one of an electric field, a magnetic field, and an electromagnetic field, frequency-modulated or otherwise phase-modulated according to a modulation signal corresponding to a given transmission-side code; and
   a wireless power reception apparatus configured to receive the electric power signal, wherein
   the wireless power supply apparatus comprises:
      a modulator configured to generate an electric signal that is frequency-modulated or otherwise phase-modulated according to the modulation signal corresponding to the transmission-side code that is determined beforehand with the wireless power reception apparatus; and
      a transmission unit configured to transmit the electric power signal via a transmission coil so as to generate the electric power signal, and wherein the wireless power reception apparatus comprises:
a reception coil configured to receive the electric power signal;
a resonance capacitor that, together with the reception coil, forms a resonance circuit; and
a control unit configured to change the impedance of the resonance circuit based upon a reception-side code that is to correspond to the transmission-side code used in the power supply apparatus such that resonance occurs between the resonance circuit and the electric power signal;
wherein the wireless power supply system further comprises an Internet site configured to distribute the reception-side code to the wireless power reception apparatus that accesses the site.

* * * * *